Patented Nov. 9, 1926.

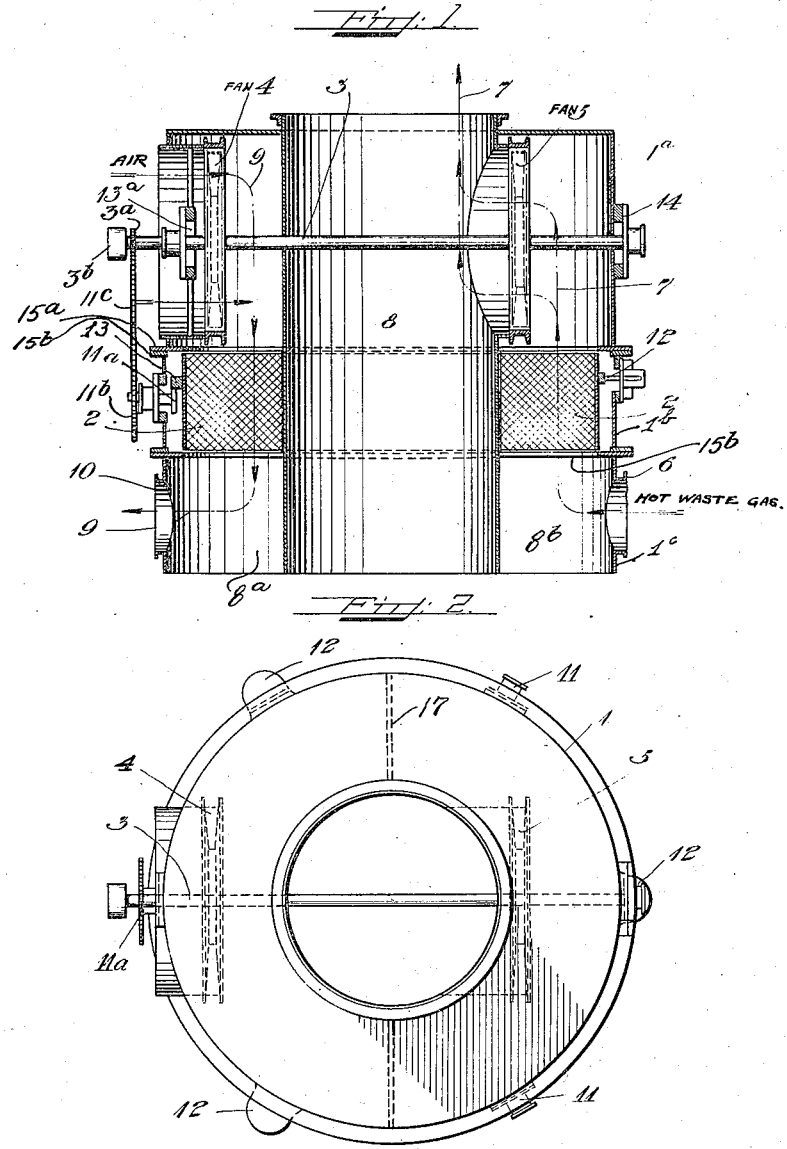

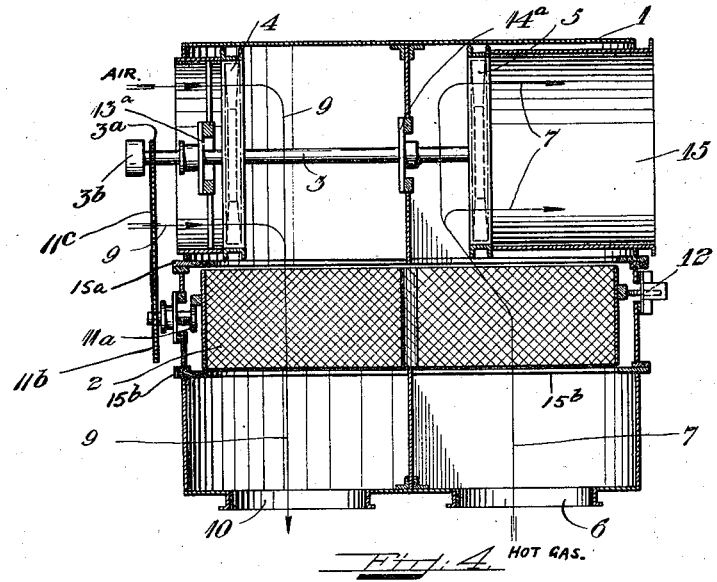
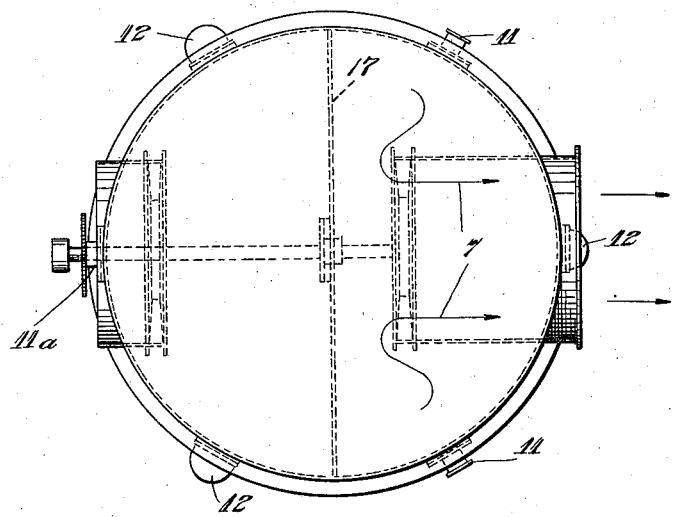

1,606,306

UNITED STATES PATENT OFFICE.

FREDRIK LJUNGSTRÖM, OF LIDINGO-BREVIK, SWEDEN, ASSIGNOR TO AKTIEBOLAGET LJUNGSTRÖMS ANGTURBIN, OF STOCKHOLM, SWEDEN, A CORPORATION.

REGENERATIVE PREHEATER FOR GAS.

Application filed September 19, 1922, Serial No. 589,244, and in Sweden July 5, 1922.

The present invention relates to regenerative preheaters for gas of the type in which a rotor containing a mass of heat-absorbing and rejecting material—otherwise known as regenerative material or regenerative mass—is rotatably mounted in a casing forming a channel for a fluid giving off heat and a channel for gas which is to be preheated, with the rotor located transversely of both of said channels.

In prior forms of this type of preheater, the rotating elements of the preheater have been journaled in the surrounding casing at points selected only with regard to the proper supporting of said elements, and in these cases the bearing assemblies have, to the detriment of the bearings, been mounted in positions within the casing where they have been exposed to the passage of hot gases. It is well known that bearings, particularly of the high speed type, must be kept as cool as possible by proper lubrication and other means and in the prior forms of construction, proper bearing temperatures have been difficult to maintain because of the position of the bearings in the path of the hot gases. Because of the excessive bearing temperatures and the faulty lubrication caused thereby, these bearings have been subject to excessive and premature wear.

The object of the present invention is to eliminate this condition by mounting the rotor in such a manner that the bearings will be located in positions where they are surrounded by comparatively cold air or gas. A further object of the invention is the location of the bearings in positions where they are easily accessible from the exterior of the casing for purposes of lubrication, replacement or repair. The invention consists in the rotatable mounting and guiding of the rotor on rollers journaled in bearings located outside the periphery of the rotor and out of the path of air or gases passing through the heater.

The accompanying drawings illustrate diagrammatically two embodiments of a regenerative heater of the type previously known, provided with bearings located in accordance with the invention. Figs. 1 and 2 are respectively vertical sectional and plan views of one embodiment and Figs. 3 and 4 are corresponding views of a second embodiment.

In the illustrative embodiment shown, the casing consists of three sections—1ª, 1ᵇ and 1ᶜ,—the upper one (1ª) of which is formed as a housing for fans 4 and 5 mounted on a common drive shaft 3, whereas the intermediate section (1ᵇ) surrounds the rotor 2 and the lower section (1ᶜ) forms an inlet channel leading to the rotor for one fluid and an outlet channel leading from the rotor for the other fluid. In the drawings the intermediate section (1ᵇ) has been shown as a cylindrical member imperforate except for the bearing mountings and while this form of section is desirable, it is not essential to the exercise of the invention, for reasons which will appear more fully hereinafter.

The embodiment shown in Figs. 1 and 2, comprises an outer casing, in which is mounted an annular rotor 2 filled with a regenerative mass 2ª, and an inner casing extending through the central opening in the rotor to form a channel 8, through which the gases may flow past the rotor if it is not intended to use the preheater. Between the inner and outer walls of the casing sections 1ª and 1ᶜ, there are arranged partitions 17 dividing said sections into two channels, one (8ª) for the air to be heated and the other (8ᵇ) for the hot waste gases, which partitions serve to keep the two fluids separate from one another. The preheater is connected with the plant to which it has to deliver preheated air or gas in such a manner that the channel conveying the waste gases from which the heat is to be taken is connected to the casing at 6, from whence the waste gases pass through the channel 8ᵇ and the rotor 2 in the direction of the arrow 7, after which they are forced by the fan 5 into the inner channel 8 of the preheater, said channel 8 being connected to, or constructed integral with the stack. The air or gas to be preheated is forced by means of fan 4, through the rotor 2 and channel 8ª in the direction of the arrow 9, after which it is conveyed through a conduit connected to the casing as at 10 to the place where it is to be used.

In accordance with the invention, the rotor 2 is provided with an outer circumferential rib 13, or the like, by means of which it is rotatably supported on a plurality of rollers 11, one of which, for example, 11ª, constitutes a frictional driving means for the rotor.

In the illustrative example shown, the roller 11$^a$ is extended through its bearing and carries a chain sprocket 11$^b$, which is connected by means of a suitable chain 11$^c$, with a drive sprocket 3$^a$ mounted on the fan shaft 3, the latter also being provided with a pulley 3$^b$ adapted to be driven from any suitable source of power. With this arrangement the fan shaft and rotor are driven at proportional speeds and the frictional drive between roller 11$^a$ and the rib 13 permits slippage, preventing damage to the driving mechanism in case the rotor 2 binds or is otherwise prevented from freely rotating. It is to be understood, however, that the particular form of driving means may be considerably varied from that shown, as it forms no part of the present invention.

The rotor is laterally guided by a second set of rollers 12, which, in the embodiment shown, are three in number and engage the outer periphery of the rib 13.

The bearings in which the supporting rollers 11, including the drive roller 11$^a$, are journaled, support the weight of the rotor and these, as well as the bearings for the guide rollers 12, are mounted in the intermediate section 1$^b$ of the casing, so that all of the rollers and their respective bearings lie outside the periphery of the rotor. In this position they are easily accessible and, moreover, are situated in the relatively cold air surrounding the rotor.

It will be readily apparent from an inspection of Fig. 1 that it is highly desirable to have all of the air or gas to be heated and the hot waste gases also pass through the regenerative rotor (except at such times as the hot gases may be by-passed through the channel 8) both to conserve the efficiency of the preheater and also to prevent the heating effect on the rollers and bearings 11 and 12, which would occur if hot waste gases were allowed to pass between the outer circumference of the rotor 2 and the intermediate casing section 1$^b$. In order to realize the maximum benefit from the present invention, it is desirable that the annular space between the outer periphery of the rotor 2 and the casing 1$^b$ be substantially sealed from the entrance of hot waste gases thereinto, and in order to accomplish this the rotor 2, as will be seen from Fig. 1, is constructed with a very small clearance between its upper and lower circumferential edges and the flanges 15$^a$ and 15$^b$ which extend around the rotor and form the bottom of the upper casing section 1$^a$ and top of the lower casing section 1$^c$. With the rotor constructed in this manner the outer periphery thereof serves to bridge the space between the upper and lower casing sections and prevents the passage of any appreciable amount of gas or air from the casing to the space surrounding the rotor. Furthermore, this construction makes it unnecessary to depend on the casing section 1$^b$ to form a seal between the casing sections 1$^a$ and 1$^c$ and this intermediate section may, if desired, be in a form other than that herein shown, as its primary functions are the proper spacing of the casing sections 1$^a$ and 1$^c$ and the formation of a suitable support for the bearings carrying rollers 11 and 12. These functions might, for example, be equally well fulfilled by a plurality of brackets connecting and properly spacing the casing sections 1$^a$ and 1$^c$ and also serving as supports for the roller bearings.

The fan shaft 3 is journaled at one end in a bearing 13$^a$ located in the cold air inlet and at its opposite end is journaled in a bearing 14 located outside the upper casing section 1$^a$. Both of these bearings, because of their location, are easily accessible and are exposed only to relatively cold air, and by this arrangement it will be seen that in this embodiment all of the bearings in the preheater are in accessible positions and in cool zones. By this arrangement the bearings may be easily maintained at proper operating temperatures and their proper lubrication and maintenance accomplished readily because of their accessible position.

In the embodiment of the invention shown in Figs. 3 and 4, the waste gases enter the preheater in the direction of the arrow 7, as in the embodiment shown in Figs. 1 and 2, but in this instance they are forced out of the preheater by the fan 5 through the conduit 15 to the stack connected thereto, or to a suitable conduit leading to the stack.

In this case the casing 1 is not provided with an inner channel nor is the rotor provided with a central opening. The rotor extends entirely across the space enclosed by the casing 1 and the by-pass for the gases past the rotor is omitted.

The air or gas to be preheated is in this case also drawn in by the fan 4, which forces it through the rotor 2 and casing 1 in the direction of the arrow 9.

The regenerative rotor is, in this embodiment, mounted and driven in the same manner as that previously described. The fan shaft 3 is also mounted at one end in a bearing 13$^a$ located in the same position as that shown in Fig. 1, but the other bearing 14$^a$ is located in a position within the casing where cold air or gas to be heated is forced around and past the bearing to cool it. If the bearing 14$^a$ were located in the same relative position as that shown in Fig. 1, it would lie in the path of the hot gases discharged through the conduit 15, which, while appreciably cooled by passage through the rotor 2, would still be at a temperature materially above that of the cold air entering the regenerator. The bearing 14ª is preferably mounted on the partition 17 dividing the upper portion of the casing into air and gas channels and in this position it will be readily apparent that while the bearing is not so accessible as in the embodiment shown in Fig. 1, it is subject to the cooling influence of the air entering the preheater.

The central by-pass opening through the preheater shown in Fig. 1 is described and claimed in my copending application Serial No. 579,528, filed August 3, 1922.

Obviously, many variations and changes in the forms shown in the illustrative embodiments may be made within the scope of the invention as defined in the appended claims.

I claim:

1. In a regenerative heating device for transmitting heat from one fluid to another, the combination with a rotor which is rotatably mounted in a horizontal plane partly in the fluid giving off heat and partly in the fluid to be heated, a regenerative material in said rotor, and a casing surrounding said rotor, of supporting rollers on which the rotor is rotatably mounted and guiding rollers to guide said rotor, all of said rollers being journaled in the casing peripherally outside the rotor.

2. In a regenerative heating device for transmitting heat from one fluid to another, the combination with a rotor which is rotatably mounted in a horizontal plane partly in the fluid giving off heat and partly in the fluid to be heated, a regenerative material in said rotor, and a casing surrounding said rotor, of supporting rollers journaled in the casing peripherally outside the rotor, on which rollers the rotor is rotatably mounted and means to drive one of said rollers and by means thereof also the rotor.

3. In a regenerative heating device for transmitting heat from one fluid to another, the combination with a rotor which is rotatably mounted in a horizontal plane partly in the fluid giving off heat and partly in the fluid to be heated, a regenerative material in said rotor, and a casing surrounding said rotor, of supporting rollers on which the rotor is rotatably mounted, means to drive one of said rollers and by means thereof also the rotor, and guiding rollers to guide said rotor, all of said rollers being journaled in said casing peripherally outside the rotor.

4. In a regenerative heating device for transmitting heat from one fluid to another, a cylinder rotatably mounted in a horizontal plane partly in the fluid giving off heat and partly in the fluid to be heated, a regenerative material in said cylinder, a casing surrounding said cylinder, a rib on the outer side of said cylinder, rollers journaled in said casing peripherally outside the cylinder supporting the same by the rib of the cylinder bearing on said rollers, means for driving one of said supporting rollers and by means thereof also the cylinder, and other rollers journaled in the casing peripherally outside the cylinder to guide the same.

5. In a regenerative heating device for transmitting heat from one fluid to another, a pair of spaced casing sections, each of which forms a portion of a channel for a fluid to be heated and also a portion of a channel for a fluid giving off heat, a cylinder rotatably mounted in a horizontal plane partly in the fluid giving off heat and partly in the fluid to be heated and bridging the space between said sections, a regenerative material in said cylinder, connecting means holding said casing sections in spaced relation, supporting rollers on which said cylinder is rotatably mounted, means to drive one of said rollers and by means thereof also the cylinder, and guide rollers to guide said cylinder, all of said rollers being journaled in said connecting means.

6. In a regenerative heating device for transmitting heat from one fluid to another, vertically posited spaced casing sections each of which forms a portion of a channel for a fluid to be heated and also a portion of a channel for a fluid giving off heat, a rotor cylinder adapted to be rotatably mounted in a horizontal plane partly in the fluid giving off heat and partly in the fluid to be heated and adapted to bridge the space between said sections, regenerative material in said rotor cylinder, supporting rollers for carrying said rotor cylinder, guide rollers for guiding said rotor cylinder, bearings for said supporting rollers and said guide rollers journalled peripherally outside the rotor cylinder, means for supporting the bearings for the rollers outside the rotor cylinder and for spacing said casing sections in given relative positions and means to drive one of said rollers and by means thereof also the rotor cylinder.

7. In a regenerative heating device for transmitting heat from one fluid to another, vertically posited spaced casing sections each of which forms a portion of a channel for a fluid to be heated and also a portion of a channel for a fluid giving off heat, a rotor cylinder adapted to be rotatably mounted in a horizontal plane partly in the fluid giving off heat and partly in the fluid to be heated and adapted to bridge the space between said sections, regenerative material in said rotor cylinder, supporting rollers for carrying said rotor cylinder, guide rollers for guiding said rotor cylinder, bearings for said supporting rollers and said guide rollers journalled peripherally outside the rotor cylinder, means for supporting the bearings for the rollers outside the rotor cylinder and for spacing said casing sections in given relative positions, means for preventing leakage of fluid from the heating device through spaces between the rotor and said spaced casing sections and means to drive one of said rollers and by means thereof also the rotor cylinder.

In testimony whereof I affix my signature.

FREDRIK LJUNGSTRÖM.